US012110903B2

(12) United States Patent
Altamura et al.

(10) Patent No.: US 12,110,903 B2
(45) Date of Patent: Oct. 8, 2024

(54) VARIABLE PITCH FAN OF A GAS TURBINE ENGINE

(71) Applicant: GE Avio S.r.l., Rivalta di Torino (IT)

(72) Inventors: Paolo Altamura, Monopoli (IT); Giulio Zagato, Moncalieri (IT)

(73) Assignee: GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 18/316,656

(22) Filed: May 12, 2023

(65) Prior Publication Data
US 2024/0151240 A1 May 9, 2024

(30) Foreign Application Priority Data

Nov. 8, 2022 (IT) .......................... 102022000022992

(51) Int. Cl.
| | |
|---|---|
| *F04D 29/32* | (2006.01) |
| *B64C 11/06* | (2006.01) |
| *B64C 11/32* | (2006.01) |
| *B64C 11/36* | (2006.01) |
| *B64C 11/38* | (2006.01) |

(Continued)

(52) U.S. Cl.
CPC ............ *F04D 29/323* (2013.01); *B64C 11/32* (2013.01); *F05D 2220/32* (2013.01); *F05D 2260/74* (2013.01); *F05D 2260/79* (2013.01)

(58) Field of Classification Search
CPC ..... F01D 7/00; F01D 5/02; F01D 7/02; F01D 5/12; F01D 17/162; F01D 25/16; F05D 2260/74; F05D 2220/32; F05D 2220/36; F05D 2270/64; F05D 2260/4031; F05D 2260/53; F05D 2260/70; F05D 2260/77; F05D 2260/50; F05D 2260/72; F05D 2260/75; F05D 2260/76; F05D 2260/79; F05D 2270/56; F05D 2270/58; F05D 2270/62; B64C 11/06; B64C 11/30; B64C 11/32; B64C 11/346; F04D 29/323; F04D 29/362; F05B 2260/70; F05B 2260/74

See application file for complete search history.

(56) References Cited

U.S. PATENT DOCUMENTS

| | | | |
|---|---|---|---|
| 2,613,750 | A | 10/1952 | Breguet et al. |
| 2,640,555 | A | 6/1953 | Cushman |
| 2,738,022 | A | 3/1956 | Zwack |

(Continued)

FOREIGN PATENT DOCUMENTS

| | | | |
|---|---|---|---|
| GB | 430557 A | 6/1935 | |
| GB | 1324385 A | 7/1973 | |

OTHER PUBLICATIONS

Willis, Quiet Clean Short-Haul Experimental Engine (QCSEE) Final Report, NASA-CR-159473, Aug. 1979, 312 Pages. (Part A & Part B).

*Primary Examiner* — Eric J Zamora Alvarez
(74) *Attorney, Agent, or Firm* — Dority & Manning, P.A.

(57) ABSTRACT

A gas turbine engine includes a turbomachine comprising a compressor section, a combustion section, and a turbine section arranged in serial flow order; a fan defining a fan axis and comprising a plurality of fan blades rotatable about the fan axis; and a pitch change mechanism operable with the plurality of fan blades to control a pitch of the plurality of fan blades. The pitch change mechanism imparts a torque to each fan blade of the plurality of fan blades via first and second forces imparted in opposite directions to each fan blade of the plurality of fan blades.

18 Claims, 6 Drawing Sheets

(51) Int. Cl.
  *B64C 11/42* (2006.01)
  *F02K 3/06* (2006.01)

(56) References Cited

U.S. PATENT DOCUMENTS

| | | | |
|---|---|---|---|
| 3,321,023 | A | 5/1967 | Russell et al. |
| 3,664,763 | A | 5/1972 | Chilman |
| 3,893,783 | A | 7/1975 | Keenan et al. |
| 3,902,822 | A * | 9/1975 | Andrews ............ F02C 7/36 |
| | | | 416/170 R |
| 3,994,128 | A | 11/1976 | Griswold, Jr. et al. |
| 4,968,217 | A * | 11/1990 | Newton ............... F02K 1/66 |
| | | | 416/147 |
| 5,152,668 | A * | 10/1992 | Bulman ............... F01D 7/00 |
| | | | 416/129 |
| 5,836,743 | A | 11/1998 | Carvalho et al. |
| 6,811,376 | B2 | 11/2004 | Arel et al. |
| 7,802,964 | B2 * | 9/2010 | Bouru ............... F04D 29/563 |
| | | | 74/25 |
| 8,267,656 | B2 | 9/2012 | Carvalho et al. |
| 8,336,290 | B2 | 12/2012 | Glynn et al. |
| 8,726,787 | B2 | 5/2014 | Glynn et al. |
| 9,068,574 | B2 * | 6/2015 | Boston ............... F04D 29/362 |
| 9,381,997 | B2 | 7/2016 | Perkinson |
| 9,869,190 | B2 | 1/2018 | Niergarth et al. |
| 9,884,675 | B2 * | 2/2018 | Curlier ............... F02K 3/072 |
| 10,072,510 | B2 | 9/2018 | Miller et al. |
| 10,100,653 | B2 | 10/2018 | Niergarth et al. |
| 10,221,706 | B2 | 3/2019 | Niergarth et al. |
| 10,364,020 | B2 | 7/2019 | Curnock et al. |
| 10,443,412 | B2 | 10/2019 | Niergarth et al. |
| 10,533,436 | B2 | 1/2020 | Niergarth et al. |
| 10,543,901 | B2 | 1/2020 | Miskiewicz et al. |
| 10,683,082 | B2 | 6/2020 | Lassalle |
| 11,118,464 | B2 | 9/2021 | Perez |
| 2007/0212221 | A1 | 9/2007 | Carvalho et al. |
| 2019/0031319 | A1 | 1/2019 | Calkins et al. |

* cited by examiner

VARIABLE PITCH FAN OF A GAS TURBINE ENGINE

PRIORITY INFORMATION

The present application claims priority to Italian Patent Application Number 102022000022992 filed Nov. 8, 2022.

FIELD

The present disclosure is related to a variable pitch fan of a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. Gas turbine engines typically include a fan assembly that provides air to a core engine and compresses the air to generate thrust. At least some known fan assemblies include variable pitch fan blades that are controlled by externally modulated flows of hydraulic fluid. Fan blade pitch controls the performance of the fan, so it may be optimized at various aircraft conditions.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGS., in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

The present disclosure is generally related to a variable pitch fan for a vehicle, such as a gas turbine engine. Embodiments of the present disclosure provide a pitch change mechanism for controlling fan blade rotation utilizing a linear actuator with a rack and pinion assembly. The pitch change mechanism transforms linear motion of racks of the pitch change mechanism to rotational torque applied to the fan blades. Embodiments of the present disclosure impart linearly opposite forces to the fan blade to change the rotational position of the fan blade, thereby resulting in minimal net axial force contributed to the gas turbine engine while imparting a net torque to the fan blade. For example, conventional pitch change mechanisms result in a positive net axial force contributed to the gas turbine engine resulting from a torque applied to the fan blade.

Figure 1:
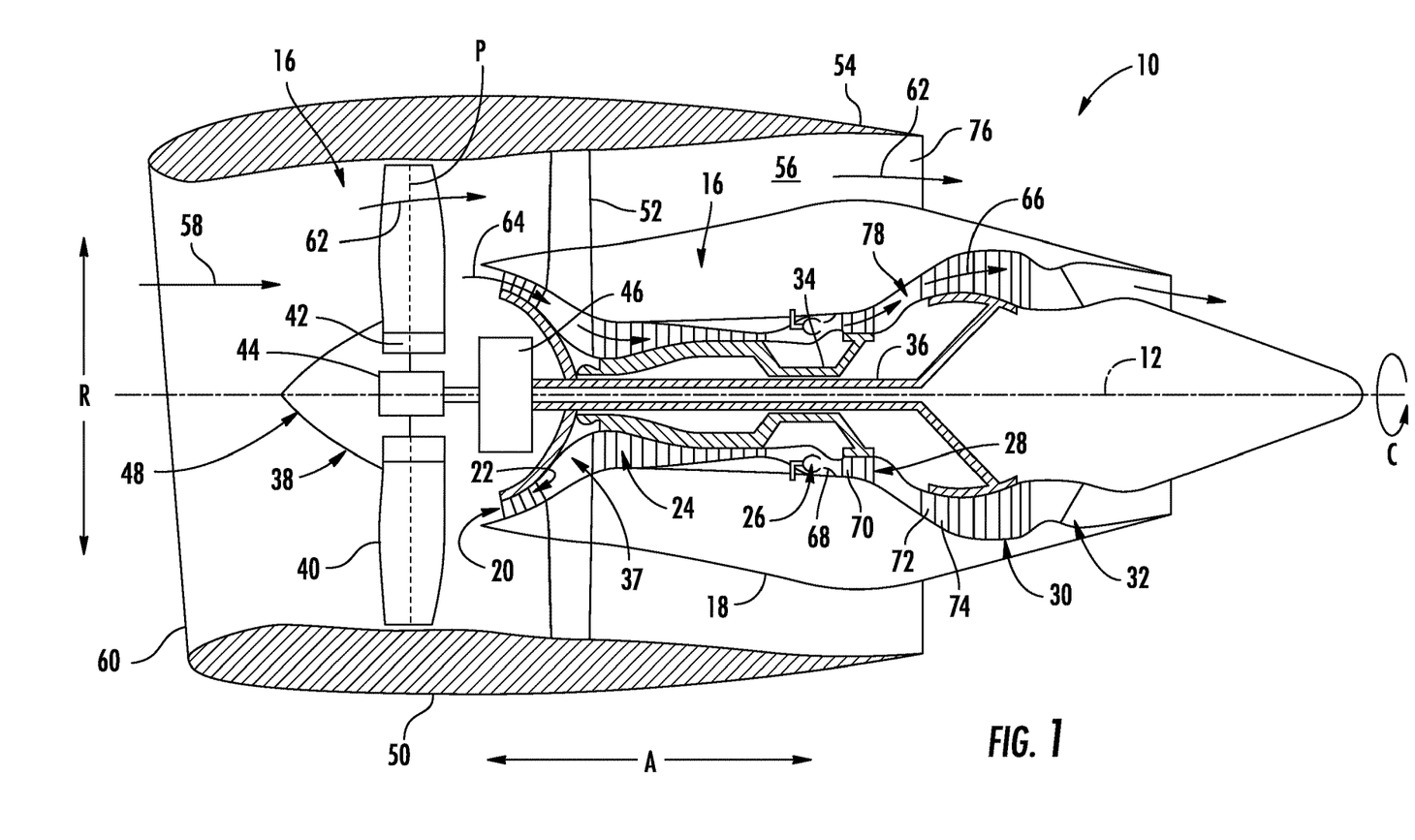
FIG. 1 is a cross-sectional view of a gas turbine engine in accordance with an exemplary aspect of the present disclosure.

Referring now to the drawings, wherein identical numerals indicate the same elements throughout the Figures, FIG. 1 is a schematic cross-sectional view of a gas turbine engine 10 in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a longitudinal axis 12 provided for reference), a radial direction R, and a circumferential direction C extending about the longitudinal axis 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gearbox 46, and the fan blades 40, disk 42, and pitch change mechanism 44 are together rotatable about the longitudinal axis 12 by LP shaft 36 across the power gearbox 46. The power gearbox 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by a rotatable front hub 48 of the fan section 14 (sometimes also referred to as a "spinner"), the front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the outer nacelle 50 is supported relative to the turbomachine 16 by a plurality of circumferentially-spaced outlet guide vanes 52 in the embodiment depicted. Moreover, a downstream section 54 of the outer nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the outer nacelle 50 and fan section 14. As the volume of air 58 passes across the fan blades 40, a first portion of air 62 is directed or routed into the bypass airflow passage 56 and a second portion of air 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the power gearbox 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
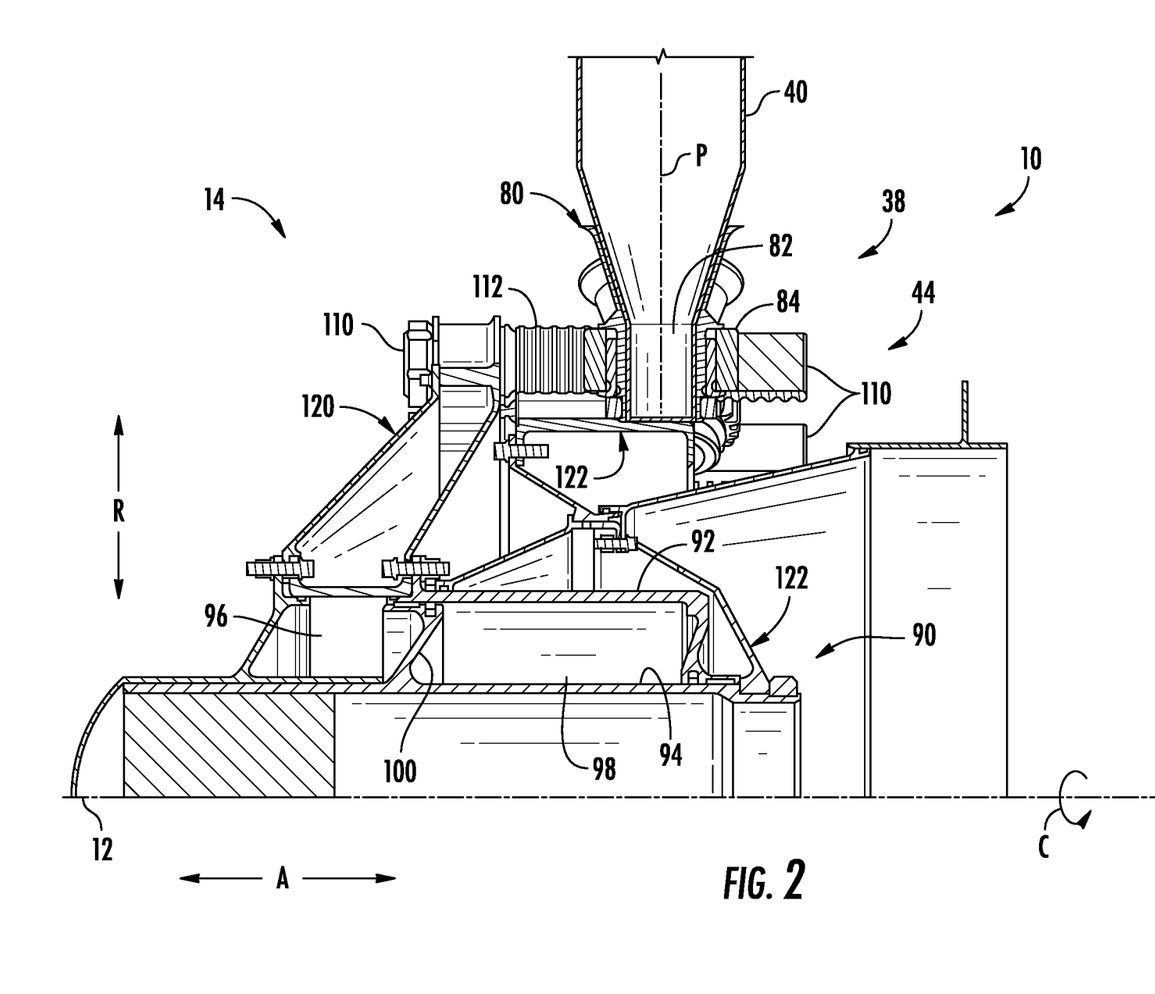
FIG. 2 is a schematic side view of a forward end of the exemplary gas turbine engine of FIG. 1 depicting an exemplary embodiment of a pitch change mechanism for a variable pitch fan of a gas turbine engine according to an exemplary aspect the present disclosure.
Figure 3:
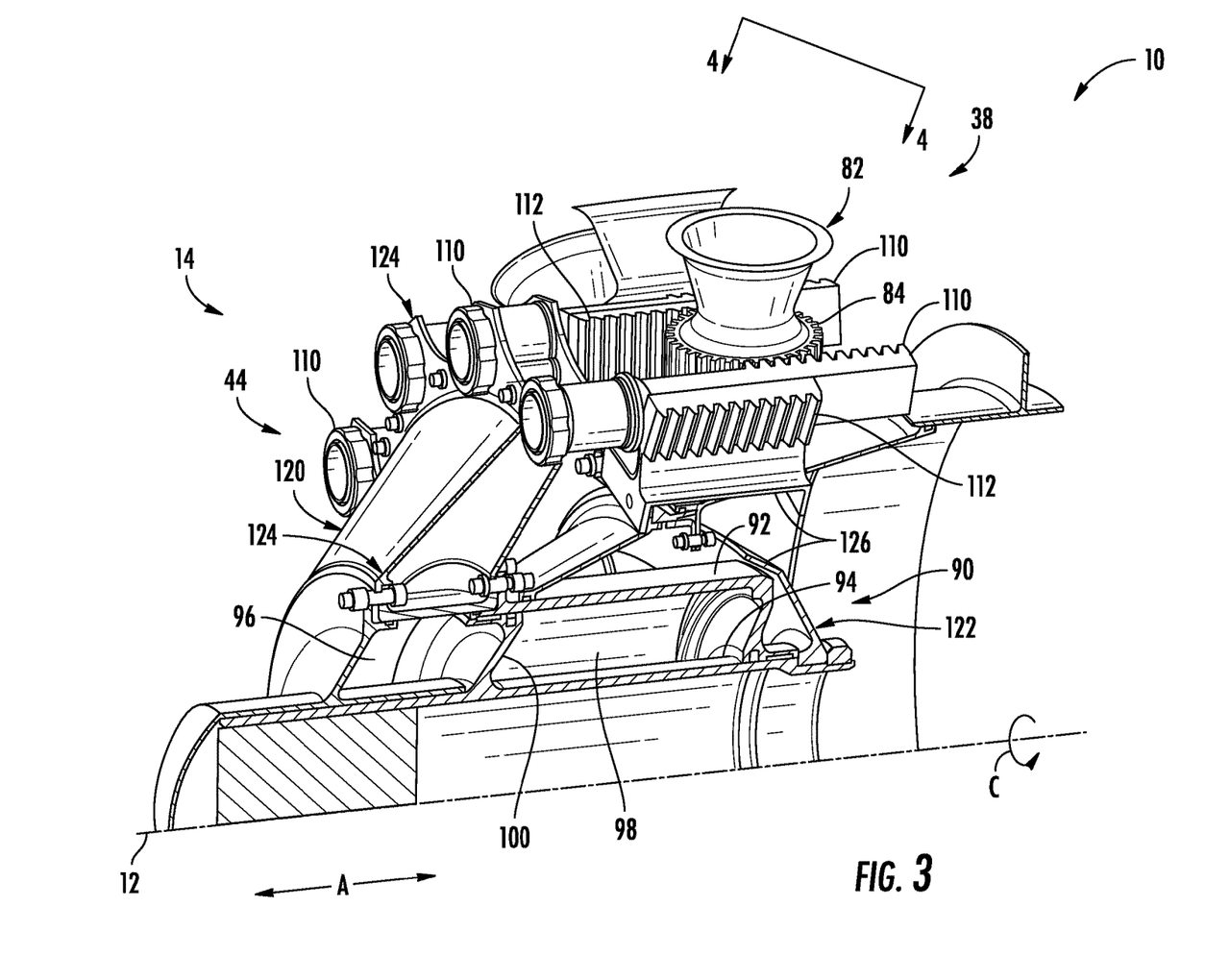
FIG. 3 is a side isometric view of a portion of the pitch change mechanism of FIG. 2 in accordance with an exemplary aspect of the present disclosure, as viewed along a longitudinal axis of the gas turbine engine.

Referring now to FIGS. 2 and 3, a forward end of a gas turbine engine 10 in accordance with an exemplary embodiment of the present disclosure is provided. Specifically, FIG. 2 provides a schematic side view of a forward end of the exemplary gas turbine engine 10 of FIG. 1 depicting an exemplary embodiment of a pitch change mechanism 44 for a variable pitch fan 38 of the gas turbine engine 10 according to an exemplary aspect the present disclosure, and FIG. 3 provides a schematic side isometric view of a portion of the pitch change mechanism 44 of FIG. 2 in accordance with an exemplary aspect of the present disclosure, as viewed along the longitudinal axis 12 of the gas turbine engine 10. In certain exemplary embodiments, the exemplary gas turbine engine 10 of FIGS. 2 and 3 may be configured in substantially the same manner as exemplary gas turbine engine 10 of FIG. 1. Accordingly, the same or similar numbering may refer to the same or similar part.

As depicted in FIGS. 2 and 3, the fan section 14 (also referred to herein as a "fan assembly") generally includes a fan 38 configured as a variable pitch fan having a plurality of fan blades 40 (only one shown in FIG. 2 and omitted from FIG. 3) coupled to the disk 42 (FIG. 1). In the illustrated embodiment, the pitch change mechanism 44 includes a trunnion mechanism 80 that facilitates rotation of a respective fan blade 40 about a pitch axis P of the respective fan blades 40. For example, in some embodiments, each fan blade 40 includes a base 82 at an inner end along a radial direction R. Each fan blade 40 is coupled at the base 82 to the disk 42 (FIG. 1) via the respective trunnion mechanism 80. Briefly, it will be appreciated that the fan 38 is configured as a forward thrust fan configured to generate thrust for the gas turbine engine 10 (and, e.g., an aircraft incorporating the gas turbine engine 10) in a forward direction. The "forward direction" may correspond to a forward direction of an aircraft incorporating the gas turbine engine 10, and in the embodiment depicted is a direction pointing to the left.

In the illustrated embodiment, each trunnion mechanism 80 includes a pinion 84 located at an inner end along a radial direction R. The pinion 84 is operably coupled to or formed as part of the trunnion mechanism 80 such that the pinion 84 and trunnion mechanism 80 rotate about the pitch axis P of a respective fan blade 40. The pinion 84 extends circumferentially about the inner end along a radial direction R of the trunnion mechanism 80 in the form of a gear having a number of teeth.

In the exemplary embodiment depicted, the pitch change mechanism 44 includes an actuator system 90 configured to rotate with the plurality of fan blades 40 of the fan 38. In the embodiment depicted, the actuator system 90 includes a cylinder 92 and a piston 94. As will be appreciated, the cylinder may be a substantially annular element extending in the circumferential direction C substantially completely around the longitudinal axis 12 of the gas turbine engine 10. Briefly, it will be appreciated that the longitudinal axis 12 is aligned with the fan axis for the embodiment depicted, and the terms may be used interchangeably with respect to the embodiment depicted.

The piston 94 is disposed within the cylinder 92 and defines a coarse pitch chamber 96 and a fine pitch chamber 98 separated by a wall 100. The coarse pitch chamber 96 and the fine pitch chamber 98 are in fluid communication with a fluid pressure source such that fluid pressure differentials within the coarse pitch chamber 96 and the fine pitch chamber 98 move the piston 94 and the cylinder 92 along the axial direction A of the gas turbine engine 10. In exemplary embodiments of the present disclosure, when pressurized, the coarse pitch chamber 96 moves the fan blades 40 toward coarse pitch angles and the fine pitch chamber 98 moves the fan blades 40 to fine pitch angles. In such a manner, it will be appreciated that the actuator system 90 may be configured as a linear actuator. In at least certain exemplary aspects, the actuator system 90 may be a pneumatic cylinder, a hydraulic cylinder, or an electrically actuated cylinder. Additionally, or alternatively, the actuator system 90 may include any other suitable configuration for moving the piston 94 and the cylinder 92 along the axial direction A.

In FIGS. 2 and 3, the pitch change mechanism 44 also includes a plurality of circumferentially-spaced forward racks 110 and a plurality of circumferentially-spaced aft racks 112. At least a portion of the forward racks 110 and the aft racks 112 are configured as straight bars with gear teeth. In the illustrated embodiment, each forward rack 110 and each aft rack 112 is positioned for movement in the axial direction A. As best illustrated in FIG. 3, each pinion 84 is in operable engagement with one of the forward racks 110 and one of the aft racks 112 such that the forward rack 110 is located on an opposite side of the pinion 84 from the aft rack 112. In other words, each pinion 84 is disposed between and is in engagement with one of the forward racks 110 and one of the aft racks 112. Accordingly, in operation, translational movement of the forward rack 110 and the aft rack 112 in the axial direction A is translated into rotational movement of the pinion 84 and corresponding rotational movement of the fan blade 40 about the pitch axis P.

In certain exemplary embodiments, the pitch change mechanism 44 also includes a forward unison ring 120 and an aft unison ring 122. The forward unison ring 120 and the aft unison ring 122 extend circumferentially about the fan axis 12 and each rotates about the fan axis 12 with the fan blades 40. The forward unison ring 120 is operably coupled at its inner end along a radial direction R to the cylinder 92 and is operably coupled at its outer end along the radial direction R to each forward rack 110. The aft unison ring 122 is operably coupled at its inner end along a radial direction R to the piston 94 and is operably coupled at its outer end along the radial direction R to each aft rack 112. The forward unison ring 120 may include one or more forward linkages 124, and the aft unison ring 122 may include one or more aft linkages 126. The forward linkages 124 extend from and/or operably couple a forward end of the cylinder 92 with the forward ends of the forward racks 110. The aft linkages 126 extend from and/or operably couple an aft end of the piston 94 with the aft racks 112. Thus, in operation, movement of the forward unison ring 120 in the axial direction A causes corresponding movement in the axial direction A of each forward rack 110 simultaneously and, e.g., in unison. Similarly, movement of the aft unison ring 122 in the axial direction A causes corresponding movement in the axial direction A of each aft rack 112 simultaneously and, e.g., in unison.

Figure 4:
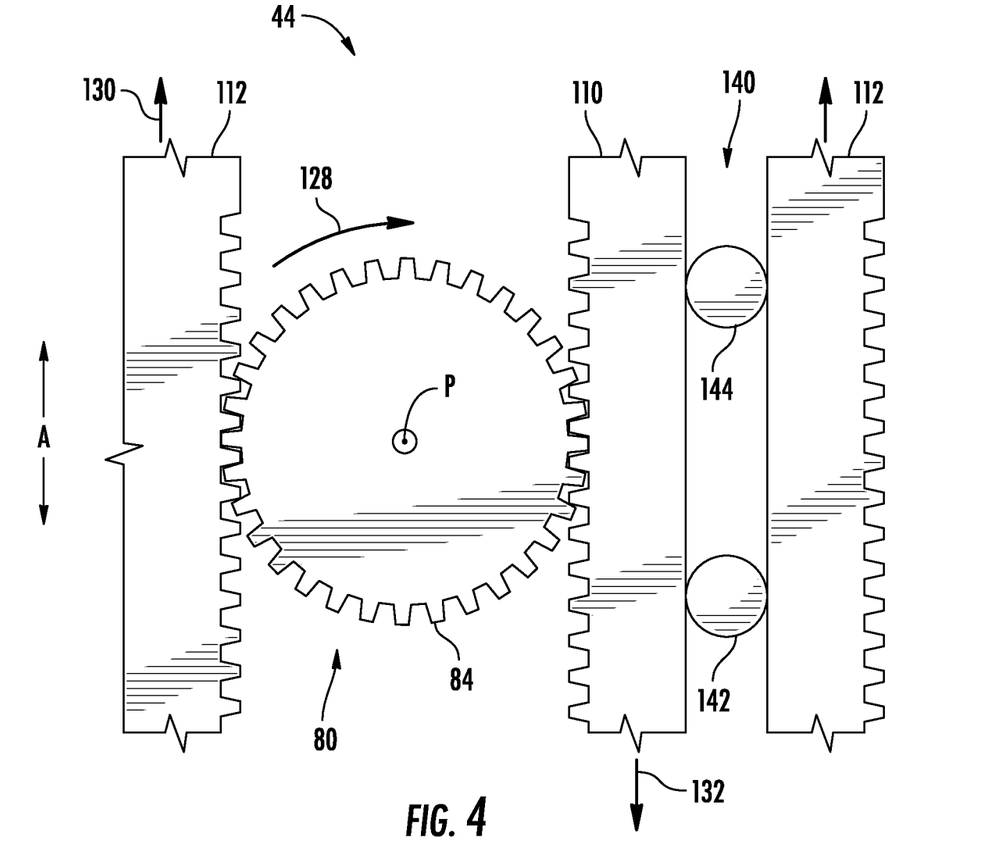
FIG. 4 is a schematic view of a portion of the of the pitch change mechanism of FIG. 2 in accordance with an exemplary aspect of the present disclosure, as viewed along a radial axis of a fan blade of the gas turbine engine.

Referring to FIG. 4, FIG. 4 is a schematic view of a portion of the of the pitch change mechanism 44 of FIGS. 2 and 3 in accordance with an exemplary aspect of the present disclosure, as viewed along a radial axis of a fan blade 40 of the gas turbine engine 10 (e.g., a view from along the line 4-4 of FIG. 3). As illustrated in the embodiment depicted in FIG. 4, the pinion 84 has a forward rack 110 operably engaged therewith on one side thereof and an aft rack 112 operably engaged therewith on an opposite side thereof from the forward rack 110. As indicated in FIG. 4, the pitch change mechanism 44 imparts a torque, represented by 128, to each fan blade 40 (FIGS. 1 and 2) via first and second forces imparted in opposite directions to each fan blade 40 (FIGS. 1 and 2). For example, in the illustrated embodiment, the forward rack 110 and the aft rack 112 are each tangentially offset from the pitch axis P of the fan blade 40 (FIGS. 1 and 3). A first force is applied by the aft rack 112 in the axial direction A to the pinion 84, represented by 130, and a second force is applied by the forward rack 110 in the axial direction A to the pinion 84, represented by 132. The forces 130 and 132 are in linearly opposite directions that are simultaneous and substantially equal in magnitude, thereby resulting in minimal net axial force applied to the gas turbine engine 10 while imparting a net torque 128 to the fan blade 40 (FIGS. 1 and 3). Thus, the forward rack 110 and the aft rack 112 each provide half of the force needed to rotate the pinion 84.

In certain exemplary embodiments, the pitch change mechanism 44 also includes a bearing assembly 140 disposed between each forward rack 110/aft rack 112 pair. For example, as depicted in FIGS. 2-4, the forward racks 110 and the aft racks 112 are disposed in an alternating arrangement extending circumferentially about the fan axis 12. In other words, following a clockwise or counter-clockwise direction circumferentially about the fan axis 12, a forward rack 110 is disposed adjacent an aft rack 112, followed by the pinion 84, then followed by another forward rack 110. Thus, the pinion 84 has an aft rack 112 on one side thereof and a forward rack 110 on an opposite side thereof. This aft rack 112/pinion 84/forward rack 110 arrangement is repeated circumferentially about the fan axis 12. Accordingly, each forward rack 110 is positioned adjacent an aft rack 112 such that the gear teeth of the aft rack 112 and the forward rack 110 are facing away from each other each toward a different pinion 84. The bearing assembly 140 provides translational support of the forward rack 110 and the aft rack 112. For the embodiment depicted, the bearing assembly 140 includes a forward roller bearing 142 and an aft roller bearing 144. However, in other exemplary embodiments, any other suitable number and/or type of bearings may be provided for supporting translational movement of the forward rack 110 relative to the aft rack 112.

Referring still to FIGS. 2-4, actuation of the actuator system 90 causes linear movement of the forward unison ring 120 and the aft unison ring 122 in opposite directions relative to each other along the axial direction A. Movement of the forward unison ring 120 and the aft unison ring 122 causes translational and/or linear movement of the forward racks 110 and the aft racks 112, respectively. The linear movement of the forward racks 110 and the aft racks 112 rotates the pinions 84 and the trunnion mechanisms 80, each of which in turn rotates a respective fan blade 40 attached thereto. As an example, actuation of the actuator system 90 may cause the forward unison ring 120 to move in a forward direction along the axial direction A, thereby causing the forward racks 110 to move in the forward direction along the axial direction A. Simultaneously therewith, the aft unison ring 122 moves in an aft direction along the axial direction A, thereby causing the aft racks 112 to move in the aft direction along the axial direction A. The forward movement of the forward racks 110 cooperates with the aft movement of the aft racks 112 to rotate the pinions 84 and corresponding trunnion mechanisms 80, each of which in turn rotates a respective fan blade 40 attached thereto.

Figure 5:
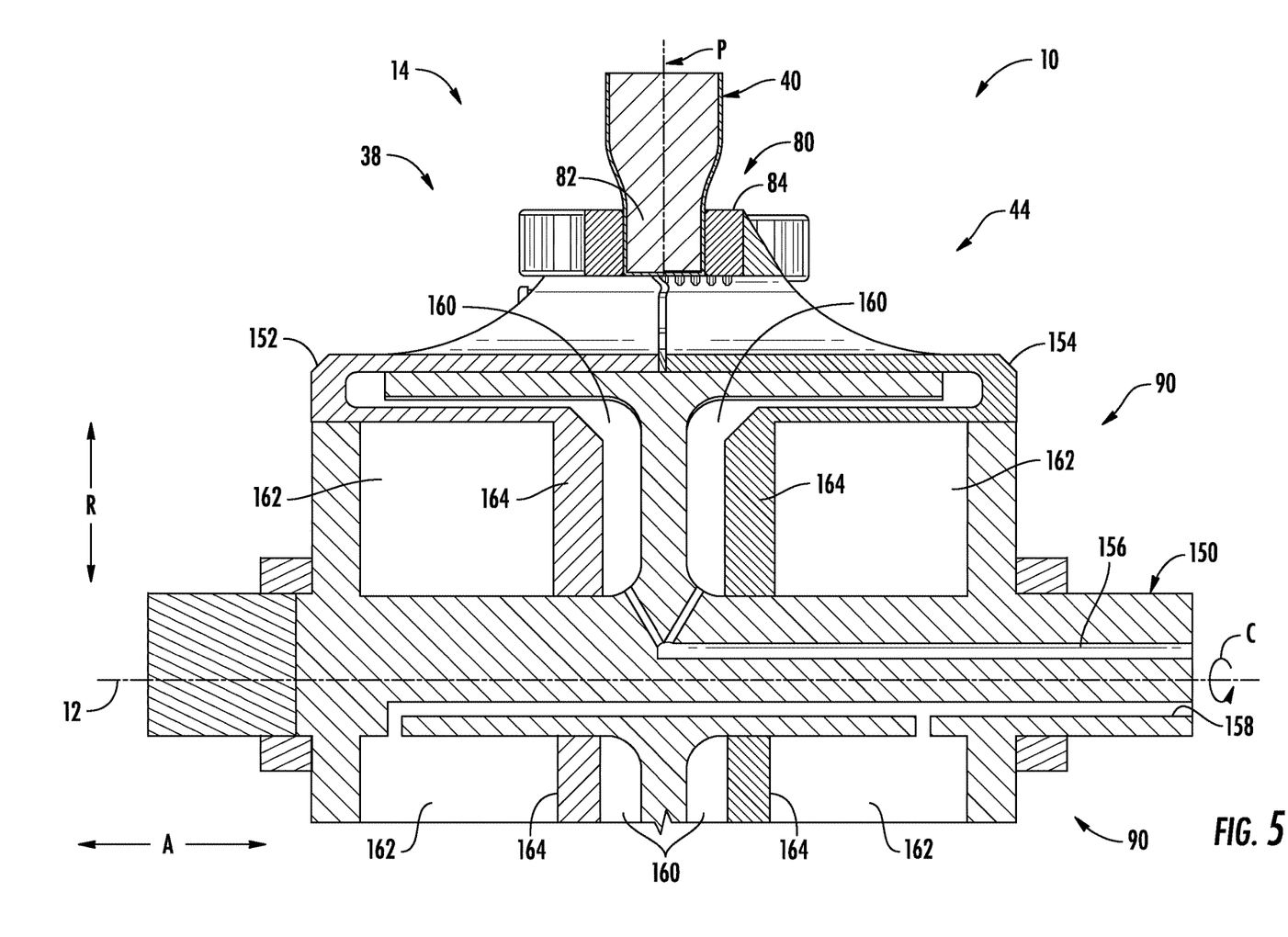
FIG. 5 is a side view of a forward end of another exemplary embodiment of a pitch change mechanism for a variable pitch fan of a gas turbine engine according to an exemplary aspect the present disclosure.
Figure 6:
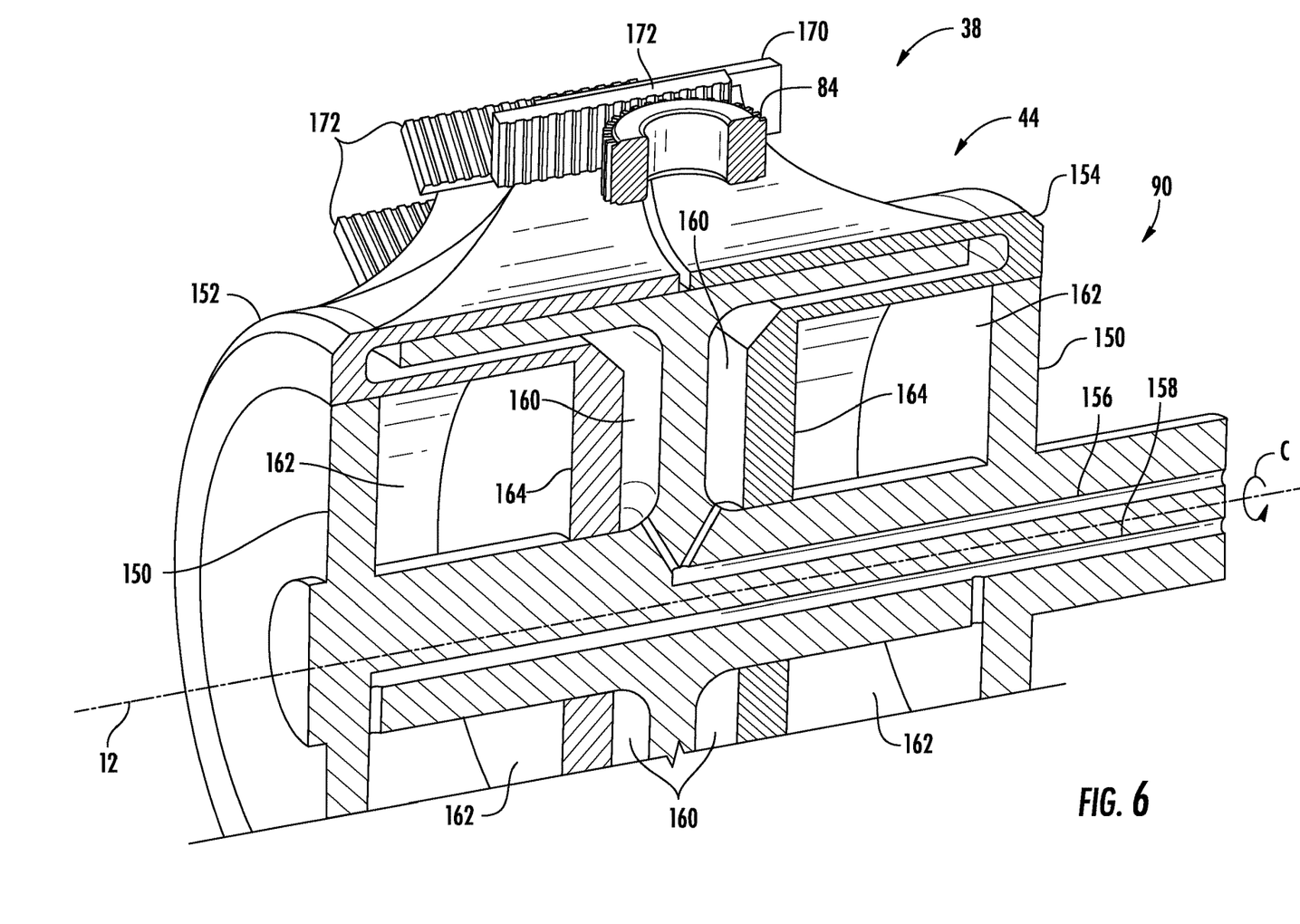
FIG. 6 is a side isometric view of a portion of the pitch change mechanism of FIG. 5 in accordance with an exemplary aspect of the present disclosure, as viewed along a longitudinal axis of the gas turbine engine.

Referring now to FIGS. 5 and 6, a forward end of a gas turbine engine 10 in accordance with an exemplary embodiment of the present disclosure is provided. Specifically, FIG. 5 provides a schematic side view of a forward end of an exemplary gas turbine engine 10, generally similar to gas turbine engine 10 of FIG. 1, depicting another exemplary embodiment of a pitch change mechanism 44 for a variable pitch fan 38 of the gas turbine engine 10 according to an exemplary aspect the present disclosure, and FIG. 6 provides a schematic side isometric view of a portion of the pitch change mechanism 44 of FIG. 5 in accordance with an exemplary aspect of the present disclosure, as viewed along a longitudinal axis 12 of the gas turbine engine 10. In certain exemplary embodiments, the exemplary gas turbine engine 10 of FIGS. 5 and 6 may be configured in substantially the same manner as exemplary gas turbine engine 10 of FIG. 1. Accordingly, the same or similar numbering may refer to the same or similar part.

As depicted in FIGS. 5 and 6, the fan section 14 (also referred to herein as a "fan assembly") generally includes the fan 38 configured as a variable pitch fan having a plurality of fan blades 40 (only one shown in FIG. 5 and omitted from FIG. 6) coupled to the disk 42 (FIG. 1). In the illustrated embodiment, the pitch change mechanism 44 includes the trunnion mechanism 80 that facilitates rotation of a respective fan blade 40 about a pitch axis P of the respective fan blades 40. For example, in some embodiments, each fan blade 40 includes the base 82 at an inner end along a radial direction R. Each fan blade 40 is coupled at the base 82 to the disk 42 (FIG. 1) via the respective trunnion mechanism 80. Briefly, it will be appreciated that the fan 38 is configured as a forward thrust fan configured to generate thrust for the gas turbine engine 10 (and, e.g., an aircraft incorporating the gas turbine engine 10) in a forward direction. The "forward direction" may correspond to a forward direction of an aircraft incorporating the gas turbine engine 10, and in the embodiment depicted is a direction pointing to the left.

In the illustrated embodiment, each trunnion mechanism 80 includes the pinion 84 located at an inner end along a radial direction R. The pinion 84 is operably coupled to or formed as part of the trunnion mechanism 80 such that the pinion 84 and trunnion mechanism 80 rotate about the pitch axis P of a respective fan blade 40. The pinion 84 extends circumferentially about the inner end along a radial direction R of the trunnion mechanism 80 in the form of a gear having a number of teeth.

In the exemplary embodiment depicted, the pitch change mechanism 44 includes the actuator system 90 configured to rotate with the plurality of fan blades 40 of the fan 38. In the embodiment depicted, the actuator system 90 includes a piston 150, a forward cylinder 152, and an aft cylinder 154. As will be appreciated, the cylinders 152 and 154 may be a substantially annular cylinders extending in the circumferential direction C substantially completely around the longitudinal axis 12 of the gas turbine engine 10. Briefly, it will be appreciated that the longitudinal axis 12 is aligned with the fan axis for the embodiment depicted, and the terms may be used interchangeably with respect to the embodiment depicted.

The piston 150 is disposed within the forward cylinder 152 and the aft cylinder 154 and defines coarse pitch chambers 160 and fine pitch chambers 162 separated by walls 164. The coarse pitch chambers 160 and the fine pitch chambers 162 are in fluid communication with a fluid pressure source via fluid channels or lines such that fluid pressure differentials within the coarse pitch chambers 160 and the fine pitch chambers 162 move the forward cylinder 152 and the aft cylinder 154 along the axial direction A of the gas turbine engine 10. In such a manner, it will be appreciated that the actuator system 90 may be configured as a linear actuator. In at least certain exemplary aspects, the actuator system 90 may be a pneumatic cylinder, a hydraulic cylinder, or an electrically actuated cylinder. Additionally, or alternatively, the actuator system 90 may include any other suitable configuration for moving the forward cylinder 152 and the aft cylinder 154 along the axial direction A. In certain exemplary aspects, fluid pressures within the fine pitch chambers 162 are used to control fine pitch adjustments to fan blade 40 position, and fluid pressures within the coarse pitch chambers 160 are used to control course pitch adjustments to fan blade 40 position.

Similar to the embodiment depicted in FIGS. 2-4, in the embodiment illustrated in FIGS. 5 and 6, the pitch change mechanism 44 also includes a plurality of circumferentially-spaced forward racks 170 and a plurality of circumferentially-spaced aft racks 172 (only one forward rack is depicted in FIGS. 5 and 6). At least a portion of the forward racks 170 and the aft racks 172 are configured as straight bars with gear teeth. In the illustrated embodiment, each forward rack 170 and each aft rack 172 is positioned for movement in the axial direction A. As best illustrated in FIG. 6, each pinion 84 is in operable engagement with one of the forward racks 170 and one of the aft racks 172 such that the forward rack 170 is located on an opposite side of the pinion 84 from the aft rack 172. In other words, each pinion 84 is disposed between and is in engagement with one of the forward racks 170 and one of the aft racks 172. Accordingly, in operation, translational movement of the forward rack 170 and the aft rack 172 in the axial direction A is translated into rotational movement of the pinion 84 and corresponding rotational movement of the fan blade 40 about the pitch axis P.

In the illustrated embodiment, each forward rack 170 is coupled to an outer end of the forward cylinder 152 along a radial direction R, and each aft rack 172 is coupled to an outer end of the aft cylinder 154 along a radial direction R. Thus, in operation, movement of the forward cylinder 152 in the axial direction A causes corresponding movement in the axial direction A of each forward rack 170 simultaneously and, e.g., in unison. Similarly, movement of the aft cylinder 154 in the axial direction A causes corresponding movement in the axial direction A of each aft rack 172 simultaneously and, e.g., in unison.

Similar to the embodiment depicted in FIGS. 2-4, the pinion 84 has a forward rack 170 operably engaged therewith on one side thereof and an aft rack 172 operably engaged therewith on an opposite side thereof from the forward rack 170. In this arrangement, the pitch change mechanism 44 imparts a torque to each fan blade 40 via first and second forces imparted in opposite directions to each fan blade 40. For example, in the illustrated embodiment, the forward rack 170 and the aft rack 172 are each tangentially offset from the pitch axis P of the fan blade 40. The aft rack 172 and the forward rack 170 move in opposite axial directions to impart a torque to the fan blade 40. For example, a first force is applied by the aft rack 172 to the pinion 84 via movement of the aft rack 172 in the axial direction A in one direction (e.g., an aft direction), and a second force is applied by the forward rack 170 to the pinion 84 via movement of the forward rack 170 in the axial direction A in an opposite direction (e.g., a forward direction). The linearly opposite directional forces applied by the forward rack 170 and the aft rack 172 to each respective pinion 84 are simultaneous and substantially equal in magnitude, thereby resulting in minimal net axial force applied to the gas turbine engine 10 while imparting a net torque to the fan blade 40. Similar to the embodiment depicted in FIG. 4, in certain exemplary embodiments, the pitch change mechanism 44 also includes the bearing assembly 140 disposed between each forward rack 170/aft rack 172 pair.

Referring still to FIGS. 5 and 6, actuation of the actuator system 90 causes linear movement of the cylinders 152 and 154 in opposite directions relative to each other along the axial direction A. Movement of the forward cylinder 152 and the aft cylinder 154 causes translational and/or linear movement of the forward racks 170 and the aft racks 172, respectively. The linear movement of the forward racks 170 and the aft racks 172 rotates the pinions 84 and the trunnion mechanisms 80, each of which in turn rotates a respective fan blade 40 attached thereto. As an example, actuation of the actuator system 90 may cause the forward cylinder 152 to move in a forward direction along the axial direction A, thereby causing the forward racks 170 to move in the forward direction along the axial direction A. Simultaneously therewith, the aft cylinder 154 moves in an aft direction along the axial direction A, thereby causing the aft racks 172 to move in the aft direction along the axial direction A. The forward movement of the forward racks 170 cooperates with the aft movement of the aft racks 172 to rotate the pinions 84 and corresponding trunnion mechanisms 80, each of which in turn rotates a respective fan blade 40 attached thereto.

Thus embodiments of the present disclosure result in no (or minimal) actuating loads reacted by either the fan shaft or hub structure and trunnion bearings (e.g., loads on each side of a fan blade neutralize each other). For example, in conventional pitch change mechanisms that apply a torque to a fan blade, the force applied to obtain that torque results in a positive net axial load that is reacted by engine structure. Embodiments of the present disclosure impart substantially equal and opposite forces that are tangentially offset from the fan blade pitch axis such that the net axial force contributed to the engine is minimized while imparting a net toque to the fan blade. For example, the opposed racks (i.e., the forward rack and the aft rack) each provide only half the force needed to actuate the pinion and provide a redundant path.

Further aspects are provided by the subject matter of the following clauses:

A gas turbine engine comprising: a turbomachine comprising a compressor section, a combustion section, and a turbine section arranged in serial flow order; a fan defining a fan axis and comprising a plurality of fan blades rotatable about the fan axis; and a pitch change mechanism operable with the plurality of fan blades to control a pitch of the plurality of fan blades, the pitch change mechanism imparting a torque to each fan blade of the plurality of fan blades via first and second forces imparted in opposite directions to each fan blade of the plurality of fan blades.

The gas turbine engine of any preceding clause, wherein the plurality of fan blades are rotatably attached to a disk using a plurality of trunnion mechanisms, each trunnion mechanism of the plurality of trunnion mechanisms including a pinion.

The gas turbine engine of any preceding clause, wherein the pitch change mechanism comprises an aft rack operably coupled to the pinion to impart the first force and a forward rack operably coupled to the pinion to impart the second force.

The gas turbine engine of any preceding clause, wherein each fan blade of the plurality of fan blades is rotatable about a respective blade pitch axis, and wherein the first and second forces are tangentially offset from the respective blade pitch axis.

The gas turbine engine of any preceding clause, wherein the pitch change mechanism further comprises a plurality of forward racks and a plurality of aft racks, each forward rack of the plurality of forward racks cooperating with a respective aft rack of the plurality of aft racks to impart the first and second forces.

The gas turbine engine of any preceding clause, wherein the plurality of fan blades includes a first fan blade circumferentially spaced apart from and a second fan blade, and wherein the pitch change mechanism comprises an aft rack operably coupled to the first fan blade to impart the first force to the first fan blade and a forward rack operably coupled to the second fan blade to impart the second force to the second fan blade, and wherein the pitch change mechanism further comprises a bearing assembly operably coupled between the aft rack and the forward rack.

The gas turbine engine of any preceding clause, wherein the first and second forces are imparted in opposite linear directions.

The gas turbine engine of any preceding clause, wherein the first and second forces are simultaneously imparted to each fan blade of the plurality of fan blades.

The gas turbine engine of any preceding clause, wherein the pitch change mechanism comprises a forward unison ring and an aft unison ring.

The gas turbine engine of any preceding clause, wherein the pitch change mechanism further comprises a plurality of forward racks coupled to the forward unison ring and a plurality of aft racks coupled to the aft unison ring.

The gas turbine engine of any preceding clause, wherein the pitch change mechanism comprises: a plurality of aft racks, each aft rack of the plurality of aft racks coupled to a respective fan blade of the plurality of fan blades; a plurality of forward racks, each forward rack of the plurality of forward racks coupled to the respective fan blade of the plurality of fan blades; and an actuator system operably coupled with the plurality of aft racks and the plurality of forward racks to control a pitch of the plurality of fan blades.

The gas turbine engine of any preceding clause, wherein the actuator system comprises an aft unison ring coupled to each aft rack of the plurality of aft racks and a forward unison ring coupled to each forward rack of the plurality of forward racks.

The gas turbine engine of any preceding clause, wherein the actuator system moves the aft unison ring and the forward unison ring in opposite linear directions.

The gas turbine engine of any preceding clause, wherein the actuator system further comprises a piston and a cylinder axially translatable relative to each other, and wherein the aft unison ring is operably coupled to the piston, and wherein the forward unison ring is operably coupled to the cylinder.

The gas turbine engine of any preceding clause, wherein the piston is disposed within the cylinder and defines a coarse pitch chamber and a fine pitch chamber.

A gas turbine engine comprising: a turbomachine comprising a compressor section, a combustion section, and a turbine section arranged in serial flow order; a fan defining a fan axis and comprising a plurality of fan blades rotatable about the fan axis; and a pitch change mechanism operable with the plurality of fan blades, the pitch change mechanism comprising: a plurality of aft racks, each aft rack of the plurality of aft racks coupled to a respective fan blade of the plurality of fan blades; a plurality of forward racks, each forward rack of the plurality of forward racks coupled to the respective fan blade of the plurality of fan blades; and an actuator system operably coupled with the plurality of aft racks and the plurality of forward racks to control a pitch of the plurality of fan blades.

The gas turbine engine of any preceding clause, wherein each fan blade of the plurality of fan blades is rotatably attached to a disk using a trunnion mechanism, each trunnion mechanism including a pinion operably coupled to a respective aft rack of the plurality of aft racks and a respective forward rack of the plurality of forward racks.

The gas turbine engine of any preceding clause, wherein each fan blade of the plurality of fan blades is rotatable about a respective blade pitch axis, and wherein the respective aft rack of the plurality of aft racks and the respective forward rack of the plurality of forward racks are tangentially offset from the respective blade pitch axis.

The gas turbine engine of any preceding clause, wherein the actuator system comprises an aft unison ring coupled to each aft rack of the plurality of aft racks and a forward unison ring coupled to each forward rack of the plurality of forward racks.

The gas turbine engine of any preceding clause, wherein the actuator system moves the aft unison ring and the forward unison ring in opposite linear directions.

The gas turbine engine of any preceding clause, wherein the actuator system further comprises a piston and a cylinder axially translatable relative to each other, and wherein the aft unison ring is operably coupled to the piston, and wherein the forward unison ring is operably coupled to the cylinder.

A pitch change mechanism for a gas turbine engine having a turbomachine and a fan, the fan including a plurality of fan blades, the pitch change mechanism comprising: a trunnion mechanism rotatably coupling each fan blade of the plurality of fan blades to a disk; a pinion coupled to each trunnion mechanism; a plurality of aft racks, each aft rack of the plurality of aft racks operably coupled with the pinion of a respective trunnion mechanism; a plurality of forward racks, each forward rack of the plurality of forward racks operably coupled with the pinion of the respective trunnion mechanism; and an actuator system operable with the plurality of aft racks and the plurality of forward racks to impart a torque to the pinion of the respective trunnion mechanism.

The pitch change mechanism of any preceding clause, wherein the pitch change mechanism further comprises a bearing assembly operably coupled between at least one of the aft racks of the plurality of aft racks and at least one of the forward racks of the plurality of forward racks.

The pitch change mechanism of any preceding clause, wherein each aft rack of the plurality of aft racks imparts a first force to the pinion of the respective trunnion mechanism in a direction opposite from a second force imparted to the pinion of the respective trunnion mechanism by each forward rack of the plurality of forward racks.

The pitch change mechanism of any preceding clause, wherein the actuator system is operably coupled with the plurality of aft racks and the plurality of forward racks to simultaneously move the plurality of aft racks and the plurality of forward racks in opposite linear directions.

The pitch change mechanism of any preceding clause, wherein the piston is disposed within a cylinder and defines a coarse pitch chamber and a fine pitch chamber separated by a wall.

The pitch change mechanism of any preceding clause, wherein fluid pressure differentials within the coarse pitch chamber and the fine pitch chamber move the piston and the cylinder along an axial direction.

The pitch change mechanism of any preceding clause, wherein, when pressurized, the coarse pitch chamber moves the fan blades toward coarse pitch angles and the fine pitch chamber moves the fan blades to fine pitch angles.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

We claim:

1. A gas turbine engine, comprising:
   a turbomachine comprising a compressor section, a combustion section, and a turbine section arranged in serial flow order;
   a fan defining a fan axis and comprising a plurality of fan blades rotatable about the fan axis; and
   a pitch change mechanism operable with the plurality of fan blades to control a pitch of the plurality of fan blades, the pitch change mechanism imparting a torque to each fan blade of the plurality of fan blades via first and second forces imparted in opposite directions to each fan blade of the plurality of fan blades;
   wherein the pitch change mechanism comprises a forward unison ring and an aft unison ring;
   wherein the pitch change mechanism further comprises a plurality of forward racks coupled to the forward unison ring and a plurality of aft racks coupled to the aft unison ring.

2. The gas turbine engine of claim 1, wherein the plurality of fan blades are rotatably attached to a disk using a plurality of trunnion mechanisms, each trunnion mechanism of the plurality of trunnion mechanisms including a pinion.

3. The gas turbine engine of claim 2, wherein the pitch change mechanism comprises an aft rack operably coupled to the pinion to impart the first force and a forward rack operably coupled to the pinion to impart the second force.

4. The gas turbine engine of claim 1, wherein each fan blade of the plurality of fan blades is rotatable about a respective blade pitch axis, and wherein the first and second forces are tangentially offset from the respective blade pitch axis.

5. The gas turbine engine of claim 1, wherein each forward rack of the plurality of forward racks cooperates with a respective aft rack of the plurality of aft racks to impart the first and second forces.

6. The gas turbine engine of claim 1, wherein the plurality of fan blades includes a first fan blade circumferentially spaced apart from a second fan blade, and wherein the pitch change mechanism comprises an aft rack of the plurality of aft racks operably coupled to the first fan blade to impart the first force to the first fan blade and a forward rack of the plurality of forward racks operably coupled to the second fan blade to impart the second force to the second fan blade, and wherein the pitch change mechanism further comprises a bearing assembly operably coupled between the aft rack and the forward rack.

7. The gas turbine engine of claim 1, wherein the first and second forces are imparted in opposite linear directions.

8. The gas turbine engine of claim 1, wherein the first and second forces are simultaneously imparted to each fan blade of the plurality of fan blades.

9. A gas turbine engine, comprising:
   a turbomachine comprising a compressor section, a combustion section, and a turbine section arranged in serial flow order;
   a fan defining a fan axis and comprising a plurality of fan blades rotatable about the fan axis; and
   a pitch change mechanism operable with the plurality of fan blades, the pitch change mechanism comprising:
     a plurality of aft racks, each aft rack of the plurality of aft racks coupled to a respective fan blade of the plurality of fan blades;
     a plurality of forward racks, each forward rack of the plurality of forward racks coupled to the respective fan blade of the plurality of fan blades; and
     an actuator system operably coupled with the plurality of aft racks and the plurality of forward racks to control a pitch of the plurality of fan blades.

10. The gas turbine engine of claim 9, wherein each fan blade of the plurality of fan blades is rotatably attached to a disk using a trunnion mechanism, each trunnion mechanism including a pinion operably coupled to a respective aft rack of the plurality of aft racks and a respective forward rack of the plurality of forward racks.

11. The gas turbine engine of claim 9, wherein each fan blade of the plurality of fan blades is rotatable about a respective blade pitch axis, and wherein the respective aft rack of the plurality of aft racks and the respective forward rack of the plurality of forward racks are tangentially offset from the respective blade pitch axis.

12. The gas turbine engine of claim 9, wherein the actuator system comprises an aft unison ring coupled to each aft rack of the plurality of aft racks and a forward unison ring coupled to each forward rack of the plurality of forward racks.

13. The gas turbine engine of claim 12, wherein the actuator system moves the aft unison ring and the forward unison ring in opposite linear directions.

14. The gas turbine engine of claim 12, wherein the actuator system further comprises a piston and a cylinder axially translatable relative to each other, and wherein the aft unison ring is operably coupled to the piston, and wherein the forward unison ring is operably coupled to the cylinder.

15. A pitch change mechanism for a gas turbine engine having a turbomachine and a fan, the fan including a plurality of fan blades, the pitch change mechanism comprising:
- a plurality of trunnion mechanisms rotatably coupling each fan blade of the plurality of fan blades to a disk;
- a pinion coupled to each trunnion mechanism;
- a plurality of aft racks, each aft rack of the plurality of aft racks operably coupled with the pinion of a respective trunnion mechanism;
- a plurality of forward racks, each forward rack of the plurality of forward racks operably coupled with the pinion of the respective trunnion mechanism; and
- an actuator system operable with the plurality of aft racks and the plurality of forward racks to impart a torque to the pinion of the respective trunnion mechanism.

16. The pitch change mechanism of claim 15, wherein the pitch change mechanism further comprises a bearing assembly operably coupled between at least one of the aft racks of the plurality of aft racks and at least one of the forward racks of the plurality of forward racks.

17. The pitch change mechanism of claim 15, wherein each aft rack of the plurality of aft racks imparts a first force to the pinion of the respective trunnion mechanism in a direction opposite from a second force imparted to the pinion of the respective trunnion mechanism by each forward rack of the plurality of forward racks.

18. The pitch change mechanism of claim 15, wherein the actuator system is operably coupled with the plurality of aft racks and the plurality of forward racks to simultaneously move the plurality of aft racks and the plurality of forward racks in opposite linear directions.

* * * * *